Aug. 22, 1961  O. FISCHER ET AL  2,996,964
PHOTOGRAPHIC CAMERA

Filed March 4, 1960  3 Sheets-Sheet 1

INVENTORS
Oskar Fischer
Paul Greger
Friedrich Papke
Gotthardt Kinder
Herbert Weidner

BY
ATTORNEYS

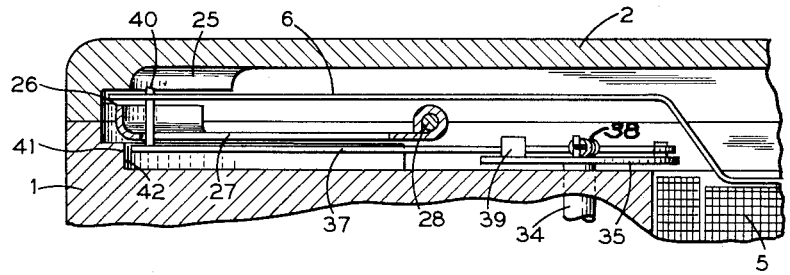
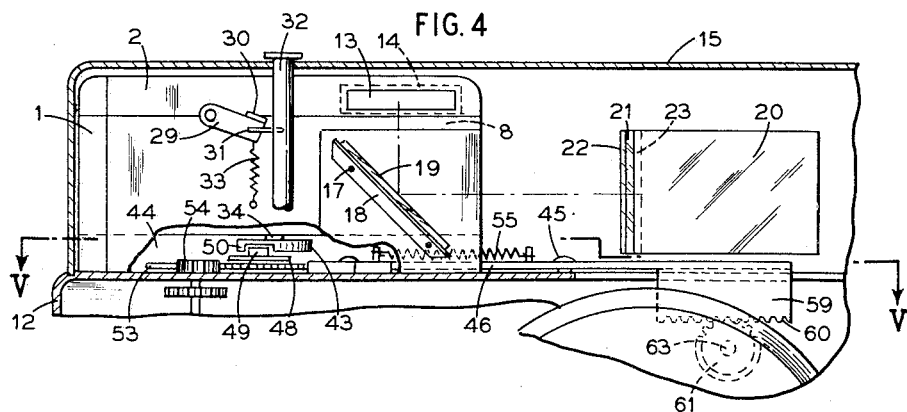
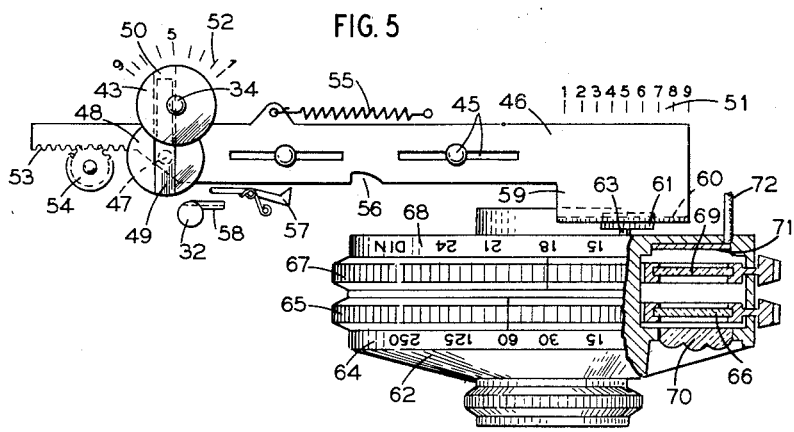

Aug. 22, 1961  O. FISCHER ET AL  2,996,964
PHOTOGRAPHIC CAMERA

Filed March 4, 1960  3 Sheets-Sheet 3

INVENTORS
Oskar Fischer
Paul Greger
Friedrich Papke
Gotthardt Kinder
Herbert Weidner
BY *Blum, Moscovitz,*
*Friedman & Blum*
ATTORNEYS United States Patent Office
2,996,964
Patented Aug. 22, 1961

2,996,964
PHOTOGRAPHIC CAMERA
Oskar Fischer, Braunschweig-Volkmarode, Paul Greger, Braunschweig, Friedrich Papke, Braunschweig-Gliesmarode, and Gotthardt Kinder and Herbert Weidner, Braunschweig, Germany, assignors to Voigtländer A.G., Braunschweig, Germany, a corporation of Germany
Filed Mar. 4, 1960, Ser. No. 12,738
Claims priority, application Germany Mar. 28, 1959
10 Claims. (Cl. 95—10)

This invention relates to still cameras provided with means for automatically pre-setting the adjustment of an exposure condition of the camera in accordance with the indication of an exposure meter, and, more particularly, to improved, simplified, and protected means for providing, in the viewfinder of the camera, an image of the position of the indicating pointer or the like of the exposure meter.

In known cameras of this type, either the exposure meter and the indication sensing device therefor are installed separately from each other in the body of the camera, or they are both positioned on a common mounting plate. In the first place, not only is assembly of the camera, and particularly of the exposure meter and the sensing device therein, difficult, but also there is difficulty in installing and adjusting the connections between the sensing device and the movable element of the exposure meter. In the second case, the parts on the common mounting plate are readily subject to damage and also to collection of dust thereon before the mounting plate is installed in the camera.

In cameras of this type, the simultaneous sensing of the indication of the exposure meter, and corresponding adjustment of the setting means for an exposure condition of the camera, are usually effected responsive to actuation of the shutter release key, so that the sensing and adjustment occur a minute interval before opening of the shutter. For the purpose of determining, prior to the release of the shutter, whether the prevailing light conditions of the subject to be photographed are such that a correct exposure of the film will be attained, it is known to provide a recognizable image of the pointer of the exposure meter in or on the image field of the viewfinder. It is further known to provide, in the range of deflection of the exposure meter pointer, field areas which signify that, when the pointer of the exposure meter extends thereinto, either an overexposure or an underexposure will result if the shutter is released. However, in such cameras as hitherto constructed, the optical elements which deflect the image of the exposure meter pointer into the viewfinder are arranged separately from the exposure meter and the sensing device, in the body of a camera, thus increasing the difficulty and expense of assembling the camera.

In accordance with the present invention, the aforementioned difficulties in protecting the exposure meter and the indication sensing means therefor, before assembly into the camera, as well as those of installing and adjusting these elements in the camera, are eliminated by mounting the exposure meter and its indication sensing means in a closed housing which also carries optical elements, including a mirror, for deflecting an image of the pointer of the exposure meter into the viewfinder of the camera. The indicating mechanism of the exposure meter, the indication sensing means, and the mirror are thus mounted, independently and separately of the camera, in or on this closed housing. The installation of the housing in the camera, and the coupling of the devices mounted in or on the housing with associated parts in the camera body, can then be effected in a simple and expeditious manner.

Such installation and interconnecting of the parts can be further facilitated, expedited, and simplified in accordance with a further feature of the invention, in which a setting means for a clamping device for the movable element of the measuring mechanism to be sensed, a setting means for the sensing device, and a cable connecting the measuring means to the photo-sensitive cell, are all mounted in the housing and have coupling elements extending therefrom. These coupling elements, upon installing of the housing in the camera, are engageable with mating coupling elements in such a manner that the setting means for the clamping device is connected with the shutter release key in the camera while the setting means for the indication sensing device is connected with setting means, in the camera, for an exposure condition thereof, such as the diaphragm speed and/or the shuter speed.

For an understanding of the invention principles, reference is made to the following description of a typical embodiment thereof, as illustrated in the accompanying drawings. In the drawings:

FIG. 3 is a sectional view, on an enlarged scale, of the sensing device, a pointer of the exposed meter, and the sensing device element cooperable with such pointer, the parts being shown in a position different from that shown in FIG. 2;

FIG. 4 is a partial sectional view of a still camera in the cover of which is mounted the housing shown in FIGS. 1 through 3;

FIG. 5 is a sectional view, on the line V—V of FIG. 4, illustrating the coupling of the sensing device to a camera setting means in the still camera;

Figure 1:
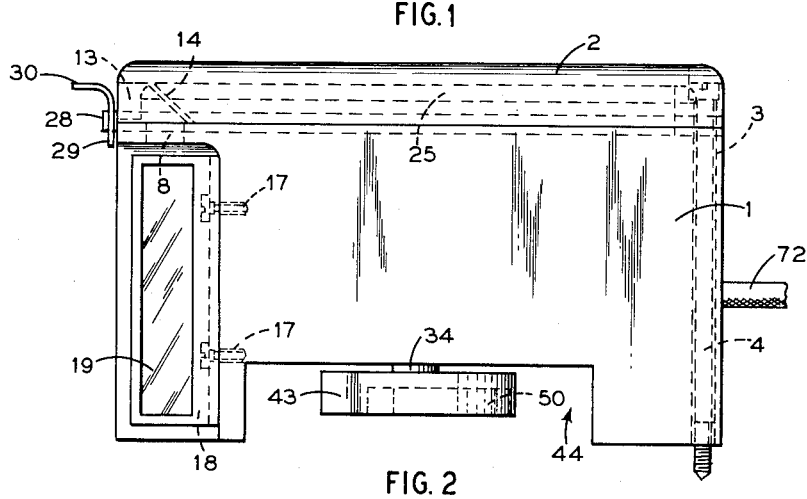
FIG. 1 is a side elevational view of a housing adapted to be mounted in the camera body and containing an electric exposure meter and a sensing device.

Referring to FIGS. 1 through 4, a housing 1, containing an electric exposure meter and the device for sensing the position of the exposure meter, is shown as closed by a cover 2 which may consist of transparent plastic and is fastened to the housing by screws, such as 4, engageable in holes 3 (FIG. 2) of the housing. As shown in FIG. 1, two of these screws can, for instance, extend completely through the housing 1 and have the further function of fastening the housing 1 to the body 12 of the camera shown in FIG. 4.

Two pointers 6 and 7, illustrated as perpendicular to each other, are secured to move with the movable coil 5 of the exposure meter. A window 8 is positioned in the housing 1 in the path of movement of the pointer 7, and has a transparent pane 9 with its two end zones 10 and 11 colored, respectively green and red, for example, the pointer 7 being positioned in one of these end zones at each extremity of its deflection range. The pane 9 and the end of the pointer 7 adjacent thereto can be seen in the image field of the viewfinder of the camera when the housing 1, together with its cover 2, is fastened to the camera body 12 as partly illustrated in FIG. 4.

Figure 6:
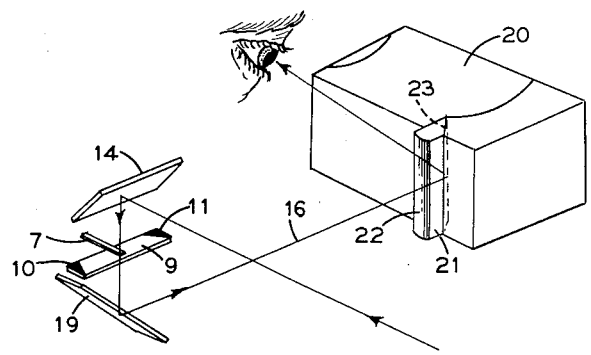
FIG. 6 is a perspective diagrammatic view of a camera viewfinder and an arrangement of mirrors by means of which the position of the exposure meter pointer is made visible in the viewfinder.

For this purpose, and is shown in FIGS. 1 and 4, the lid 2 of housing 1 is provided with a light admission window 13. Behind window 13, as also illustrated in FIG 6, there is an oblique mirror 14 which deflects a beam of light 16 (FIG. 6), entering through an opening (not shown) in a lid 15 (FIG. 4) of the camera, through the pane 9 and onto pointer 7. As shown more particularly in FIGS. 1, 2, and 6, a support 18 for a mirror 19 is fastened to a side wall of housing 1 below the window 8, by screw 17, mirror 19 deflecting the beam of light 16 to a viewfinder (FIGS. 4 and 6).

Figure 7:
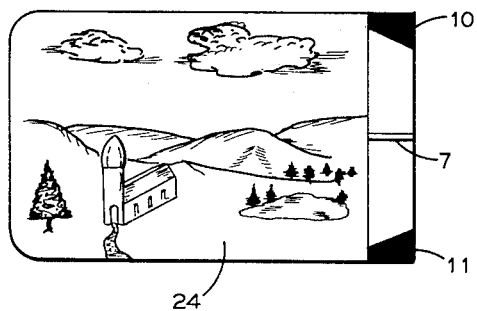
FIG. 7 illustrates the view seen in the viewfinder with the arrangement of FIG. 6.

Viewfinder 20 comprises a glass block in which there is cemented a glass body 21 having a toric lens surface 22 and a surface 23 provided with a reflective coating. Toric lens 22 effects sharp focusing of pointer 7 and pane 9 into the eye of a viewer, to which the mirrored surface 23 deflects light ray 16. An eye peering into the viewfinder 20 sees the picture shown in FIG. 7. It will be noted that, on one side of the field of the viewfinder image 24, the pointer 7 and the colored end zones 10 and 11 of pane 9 can be observed.

Figure 2:
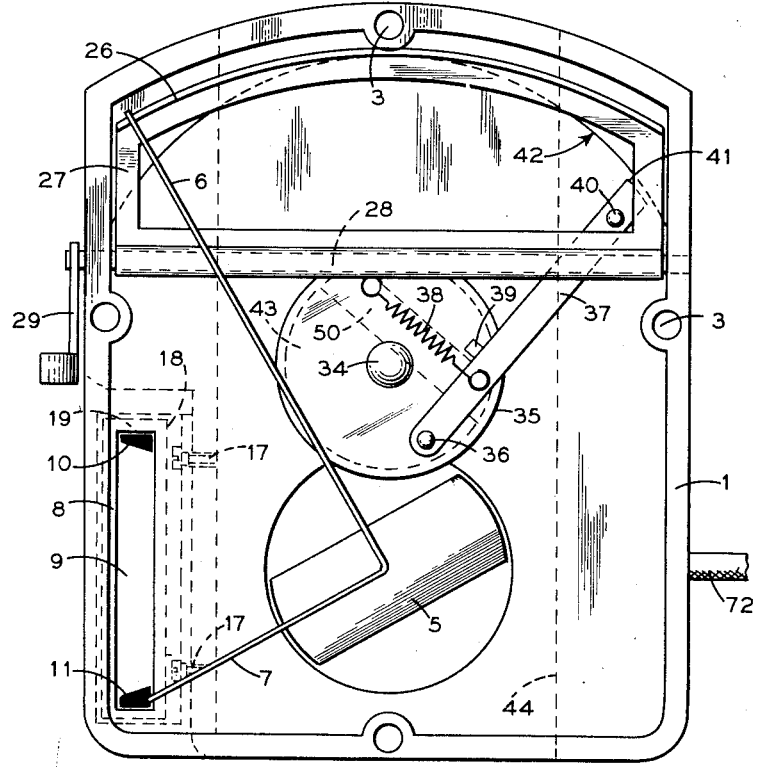
FIG. 2 is a top plan view of the housing shown in FIG. 1, with the lid or cover of such housing removed.

The free end of pointer 6, over its entire range of movement, moves between a fixed clamping surface 25 in lid 2 of housing 1 and a bent front edge 26 of an oscillatably mounted clamping strap 27, as best seen in FIG 3. Clamping strap 27 is secured to a shaft 28 oscillatably mounted in a bearing conjointly formed by housing 1 and its cover 2. As best seen in FIGS. 1, 2, and 4, a lever arm 29 is secured to the end of shaft 28, which projects out of housing 1, and arm 29 has a bent lug 31 on its free end. As shown in FIG. 4, lug 30 has its lower edge cooperable with a pin 31 projecting from a shutter release key 32. In the drawings, key 32 is shown in its depressed position just releasing the shutter. A tension spring 33 biases lever arm 29 toward pin 31 so that lug 30 is maintained in continuous engagement with pin 31. This results in a rotation of shaft 28, and thus of clamp 27, in accordance with movements of release key 32 and its pin 31. Upon depression of release key 32, the rotation of shaft 28 is effected in a direction to move the free edge of clamp 27 toward surface 25 so that the free end of pointer 6 is clamped between edge 26 of clamp 27 and the surface 25. Upon return motion of shutter release key 32, which may be effected by a compression spring (not shown), the pin 31 acts on the lug 30 in a direction to rotate shaft 28 to swing edge 26 of clamp 27 away from pointer 26 and thus release the free end of the pointer from its clamping between edge 26 and shutter 25. The force exerted by the compression spring on the shutter release key exceeds the force exerted by tension spring 33 on lever 29.

The device for sensing the instantaneous position of the clamped pointer 6 is best illustrated in FIGS. 2 and 3. A shaft 34 rotatably mounted in housing 1 has a disk 35 on one end thereof. A sensing lever 37 is oscillatably mounted on a pin eccentrically positioned on disk 35, and a relatively light spring 38, secured between disk 35 and sensing lever 37, biases the sensing lever to engage a stop 39 secured to disk 35. The free end of sensing lever 37 has extending therefrom a sensing pin 40 which extends into the path of movement of the free end of pointer 6. At a slight distance from the free end surface 41 of sensing lever 37, there is provided a surface 42, in housing 1, and this surface extends at right angles to the plane of movement of sensing lever 37 and in a circular path concentric with shaft 34.

In sensing the position of pointer 6, the disk 35 turns counterclockwise, from its position shown in FIG. 2, and the end surface 41 of sensing lever 37 moves parallel to the surface 42. When sensing pin 40 engages pointer 6, which is clamped at its light value indicating position in the manner described above, the movement of the outer end of lever 37 is interrupted. However, and as described hereinafter, the disk 35 continues to turn counterclockwise, so that stop 39 moves away from lever 37 against the force of the light tension spring 38. Since lever 37 is pivotal on the bolt 36 which is mounted eccentrically on the disk 35, lever 37, upon such further counterclockwise rotation of disk 35, will be moved substantially longitudinally of itself toward the surface 42 so that its end surface 41 will engage surface 42. With suitable design of the surfaces 41 and 42, there will thus occur a wedging of the sensing lever 37 against the surface 42, thus preventing any further counterclockwise rotation on disk 35. The clamped pointer 6 which, in any event had only to resist the pressure exerted by the sensing pin 40 due to the relatively light force of the light spring 38, is thus relieved of any further pressure against itself.

The degree of rotation of shaft 34 in sensing the position of pointer 6 is a measure of the amount by means of which a setting means for the camera shutter must be adjusted. This setting means can be, for example, the exposure value setting means of the shutter coupled with the diaphragm and shutter speed setting means. However, it is also possible to utilize the turning movement of shaft 34 to set the shutter time or the diaphragm setting means. In the particular embodiment of the invention illustrated more in detail in FIGS. 4 and 5, the diaphragm setting means of the lens of the camera is adjusted in correspondence with the movement of shaft 34.

For this purpose, there is provided, in association with the shaft 34, means for converting the non-linear movement of this shaft, corresponding to linear changes in light value, into linear adjustment of the diaphragm setting means in accordance with such linear changes in light value. This coupling means includes a coupling disk 43 secured to the opposite end of shaft 34 and, as best seen in FIG. 1, disposed within a tunnel 44 formed in the outer bottom surface of housing 1. When housing 1 is fastened to the camera body 12, a longitudinally slidable setting slide 46, slidably mounted on camera body 12 by means of pin and slot connections 45, lies within the tunnel 44. A pin 47 secured to slide 46 rotatably mounts a preferably circular plate 48 having a coupling rib 49 projecting from its upper surface, this coupling rib preferably extending diametrically of the axis of pin 47. Coupling rib 49 has mating engagement in a groove 50 extending across the bottom surface of disk 43 parallel to a diameter of its axis of rotation but radially off-set from such axis.

The relation between the linear movement of setting slide 46 and the resultant rotary movement of the coupling disk 43 is dependent on the distance, at any particular time, between the pivotal axes of circular plate 48 and coupling disk 43, and furthermore on the position which coupling rib 49 and its mating groove 50 assume with respect to the pivoting axis of their respective supports 48 and 43.

The coupling arrangement illustrated in FIGS. 4 and 5, by means of which the distance between the axes of rotation of disk 43 and plate 48 can be adjusted, results in equal increments of movement of setting slide 46 effecting unequal increments of movement of coupling disk 43. This is best illustrated by the scale 51 shown, only in order to clarify the explanation of the operation of the coupling, as opposite the setting disk 46, and the scale 52 shown, only for illustrating the operation of the coupling, as opposite the coupling disk 43. It will be noted that the graduations of scale 51 are equal, whereas those of scale 52 are unequal. For example, the graduations between the scale values "5" and "9" of scale 52 and the graduations between the values "5" and "1" of scale 52 are unequal to each other. The graduation of scale 52 corresponds to the deflection characteristic of the pointer 6 of the exposure meter, whereas the graduations of scale 51 correspond to the movement of the diaphragm setting device.

As shown in FIGS. 4 and 5, slide 46 is formed with a rack 53 engaging a pinion 54 which is connected with the film advance or transport mechanism of the camera, this mechanism not being shown in detail. This connection is of such a nature that, upon each advance of the film, the setting slide 46 is moved, against the bias of a spring 55, into one end position, for example the left end position as shown in FIG. 5. A recess 56 is formed in the bottom edge, as viewed in FIG. 5, of the slide 46 and, at the limit of movement of slide 46 to the left, as shown in FIG. 5, a pawl 57 mounted in body 12 and spring biased, engages end recess 56 so as to lock slide 46 in its set position. Coupling disk 43, as well as disk 35 which is rigidly connected to disk 43, and the sensing lever 37 supported on disk 35, then assume the initial position shown in FIG. 2.

Pawl 57 is arranged to be engaged by a wedge cam surface 58 on the shutter release key 32 so that, upon actuation of key 32, pawl 57 is released from engagement with notch 56. Setting lever 46 also has a lug 59 bent at an angle therefrom and having its front edge formed with a rack 60 engaged with a pinion 61 on a shaft 63 projecting from the rear wall of shutter housing 62. In a manner forming no part of the present invention, shaft 63 is connected with the setting means of an iris diaphragm in the shutter housing, so that the iris diaphragm is opened and closed in accordance with rotation of shaft 63.

In shutter housing 62, there is supported a shutter speed ring 65 which can be rotatably adjusted with respect to a stationary scale 64 and which includes, in the part of the ring lying within housing 62, an annular wedge 66 of variable light transmission properties. The light transmission properties of wedge 66 vary in the direction of rotation of ring 65. A second ring 67, supported in housing 62, is adjustable in accordance with a film speed scale 68 on the housing and carries, in the part of the ring disposed within the housing 62, an annular variable light transmitting wedge 69 graduated in the direction of rotation of ring 67. A honey-comb or lenticulular lens 70 in the front wall of shutter housing 62 permits light to fall on the wedges 66 and 69, known as "gray" wedges, and to pass through these wedges onto a light-sensitive cell 71 connected by a cable 72 with the exposure meter in the housing 1. Cable 72 is also shown in FIGS. 1 and 2.

The arrangement described above operates in the following manner. After a film has been placed in a camera and, upon its advance to the first picture area by means of the rotation of gear 54 resulting in rotation of rack 53, setting slide 46 is moved to its extreme left position in which it is locked by pawl 57 engaging in notch 56. The device sensing the position of pointer 6 of the exposure meter is then in the position shown in FIG. 2, while the iris diaphragm in the shutter housing 62 has been operated by means of rack 60 and pinion 61 to one limit of its range of movement. Depending upon the desired conditions, this position can be either the fully open position or the smallest aperture position. Setting ring 67 is now set in accordance with the speed of the film used, for instance to the value "18 DIN." With this setting, a field of the wedge 69 adapted to this value of film speed is interposed between lens 70 and cell 71. Ring 65 is then turned to adjust the shutter speed for a value which would appear to be suitable for the intended picture to be taken, for example "1/60 sec." This results in a field of wedge 66, adapted to this shutter speed value, being interposed between lens 70 and cell 71. When cell 71 is exposed to the light from the scene to be photographed, it has an electrical output resulting in a deflection of pointers 6 and 7 of the exposure meter, which deflection is dependent upon the film speed and the exposure time. The wedges 66 and 69, in association with cell 71, and the exposure meter, are so correlated that the deflection of pointer 6 constitutes a measure of the diaphragm value to be set.

The deflection of the exposure meter can be observed by looking into the viewfinder of the camera, from the corresponding position of pointer 7. If pointer 7 is at some place in the region between the colored end zones 10 and 11, this means that a photograph is possible with the prevailing light conditions, shutter speed, and film speed. If pointer 7 is, however, within the green zone 10, then an overexposed picture would be obtained upon release of the shutter. By setting a shutter speed, for instance "1/250 sec.," a portion of wedge 66 less permeable to light than the previous portion can be caused to be interposed between lens 70 and cell 71, as a result of which pointer 7 has a smaller deflection and then is outside the colored zone 10.

However, if pointer 7 extends into the red zone 11, as observed in the viewfinder, then an underexposed picture would be obtained upon the release of the shutter. In this case, a longer shutter speed, for instance "1/30 sec." must be set, in which case a portion of wedge 66 which is more permeable to light than the previous portion is interposed between lens 70 and cell 71. If, despite the resultant greater deflection, the pointer 7 is still within the colored zone 11, this indicates that, under the prevailing light conditions, a photograph is still not possible even with this longer shuter speed. Consequently, the photographer either must forget about the picture or else select a still longer shutter time (exposure time) to result in the pointer 7 lying in the region between the colored zones 10 and 11.

Upon actuation of shutter release key 32, pointer 6 is first clamped fast in its position indicating the measured light value. Immediately thereafter, and upon further depression of release key 32, setting slide 46 is released by pawl 57 and is drawn to the right by spring 55. As a result of this movement of slide 46, coupling disk 43 is turned to rotate the shaft 34, disk 35, and lever 37. Rotation of coupling disk 43, and thus of the setting circular plate 46, is arrested when sensing lever 47 becomes wedged against surface 42 as element 40 engages lever 6. In this manner, the setting of the iris diaphragm, coupled for linear scale movement with setting slide 46, is also effected, so that the iris diaphragm is now set at a value which is adapted to the prevailing light conditions and takes into consideration the shutter speed selected and the speed of the film.

While specific embodiments of the invention have been shown and described in detail to illustrate the application of the invention principles, it will be understood that the invention may be embodied otherwise without departing from such principles.

What is claimed is:

1. In a still photographic camera of the type including a viewfinder, a shutter release key, an exposure condition setting means, an electric exposure meter including a movable indicating element, a sensing device operable to sense the indicating position of said element, and transmission means interconnecting said sensing means and said setting means to adjust the exposure condition in accordance with the indication of said element: the improvement comprising a housing disengageably mounted on the body of said camera; the indicating mechanism of said meter, including said indicating element, being mounted in said housing; an optical system, including a mirror, mounted with said housing and effective, upon mounting of said housing on the camera body, to reflect the image of said indicating element into the field of the viewfinder; said housing having a window opening in a side wall thereof; a support secured to said side wall adjacent said window opening; said mirror being mounted on said support; said indicating mechanism including a rotatable coil and a pointer secured to said coil and extending therefrom; the free end of said pointer extending into the region of said window opening; and a transparent window in said window opening, the free end of said pointer moving over said transparent window; said window having colered zones at each end at substantially the limits of movement of the free end of said pointer.

2. In a still photographic camera of the type including a viewfinder, a shutter release key, an exposure condition setting means, an electric exposure meter including a movable indicating element, a sensing device operable to sense the indicating position of said element, and transmission means interconnecting said sensing means and said setting means to adjust the exposure condition in accordance with the indication of said element: the improvement comprising a housing disengageably mounted on the body of said camera; the indicating mechanism of said meter, including said indicating element, being mounted in said housing; an optical system, including a mirror, mounted with said housing and effective upon mounting of said housing on the camera body, to reflect the image of said indicating element into the field of the viewfinder; arresting means in said housing selectively operable to arrest movement of said indicating element in its indicating position; said sensing means being mounted in said housing; an operating component for said arresting means projecting from said housing; a first coupling element for the sensing device projecting from said housing; means on said shutter release key coacting with said operating component, when said housing is mounted on the camera body, to effect operation of said arresting means immediately upon the start of shutter releasing actuation of said shutter release key; a second coupling element included in said transmission means and engageable with said first coupling element when said housing is mounted on the camera body; said shutter release key, said transmission means and the light sensitive element of said exposure meter being mounted with the camera body; and a cable extending from said housing for electrical interconnection of the indicating mechanism of said meter with the light sensitive element thereof.

3. In a camera as claimed in claim 2: a spring connected to said operating component and normally biasing said arresting means to a position arresting movement of said indicating element; means on said shutter release key engageable with said operating component and normally retaining said arresting means in a non-arresting position when the shutter release key is in its inactive position before shutter releasing movement; the shutter release key releasing said operating component for movement of said arresting means to the arresting position, under the influence of said spring, immediately upon the start of shutter releasing actuation of said key; said transmission means including a slide reciprocably mounted in the camera body; film advance mechanism in said camera body; driving means connecting said film advance mechanism to said slide; spring means biasing said slide to one limit of movement; said film advance mechanism, when operated to advance the film, moving said slide to the other limit of movement; latch means engageable with said slide, upon movement thereof to such other limit, to retain said slide at such other limit; means associated with said shutter release key and operable upon shutter releasing actuation of the latter, and immediately after release of said operating component, to engage said latch and release said slide for movement to such one limit under the influence of said spring means; said slide, upon movement to such other limit upon operation of the film transport mechanism, moving said sensing device to a starting position and, upon release for movement to such one limit, moving said sensing device until the latter engages the indicating element in its arrested indicating position to stop movement of said slide and to terminate the adjusting movement of said exposure condition setting means.

4. In a camera as claimed in claim 2: said arresting means including a movable member oscillatable about the axis of a shaft to which it is fixed; said housing including a housing member and a cover member secured to said housing member; said housing member and said cover member conjointly forming bearings for said shaft.

5. In a camera as claimed in claim 4: said shaft projecting at one end from said housing; said operating component comprising a lever arm on the projecting end of said shaft; said lever arm, when said housing is mounted on the camera body, projecting into the path of movement of coacting means on said shutter release key.

6. In a camera as claimed in claim 5: said lever arm having a lug bent at an angle therefrom; a pin projecting from said shutter release key; a spring connected between said lever arm and a fixed portion of said housing and biasing said lever arm to rotate said movable member of said arresting means to its arresting position; said pin engaging said lever, when the shutter release key is moved toward the inactive position, to bias said lever arm, against the force of said spring, to rotate the movable member of said arresting means to a non-arresting position.

7. In a camera as claimed in claim 6: said indicating element comprising a pointer; said arresting means including an arcuate surface of said housing, concentric with the axis of movement of said pointer, and extending closely adjacent to said pointer adjacent the free end thereof; said movable member of the arresting means having a free edge which is arcuate and concentric with the axis of movement of said pointer and axially aligned with said arcuate surface, said arcuate edge being spaced from said pointer in the non-arresting position and movable against said pointer to clamp the same against said arcuate surface in the arresting position of said arresting means.

8. In a camera as claimed in claim 7: said housing including a body member having such window opening and a cover member; a second mirror secured in said cover member adjacent the window opening in the body member and operable to direct light rays entering through said window onto said first mentioned mirror; said optical system including an optical element on the camera body having a lens, through which light rays are directed from said first mentioned mirror, and a mirror surface for directing such light rays into the field of the viewfinder.

9. In a camera as claimed in claim 1: said coil having a pair of pointers extending therefrom at substantially right angles to each other; one of said pointers cooperating with said sensing device and said arresting means, and the other pointer extending into the region of said window opening.

10. In a camera as claimed in claim 2: gray wedges interposed in the path of light rays directed upon said light sensitive element; said wedges having zones of different light transmission properties and being movable with said exposure condition setting means.

References Cited in the file of this patent

UNITED STATES PATENTS

| | | |
|---|---|---|
| 2,178,361 | Riepert | Oct. 31, 1939 |
| 2,188,711 | Goldhammer | Jan. 30, 1940 |
| 2,206,626 | Blechner | July 2, 1940 |
| 2,242,043 | Sanger | May 13, 1941 |